United States Patent
Peltonen et al.

(10) Patent No.: US 6,898,592 B2
(45) Date of Patent: May 24, 2005

(54) SCOPING QUERIES IN A SEARCH ENGINE

(75) Inventors: Kyle Peltonen, Issaquah, WA (US); Dmitriy Meyerzon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 09/749,005

(22) Filed: Dec. 27, 2000

(65) Prior Publication Data

US 2002/0083054 A1 Jun. 27, 2002

(51) Int. Cl.[7] .......................... G06F 17/30; G06F 7/00; G06F 12/00
(52) U.S. Cl. ........................ 707/3; 707/1; 707/200
(58) Field of Search ............................ 707/200, 1, 3, 707/5

(56) References Cited

U.S. PATENT DOCUMENTS

| | | | | |
|---|---|---|---|---|
| 5,826,269 A | * | 10/1998 | Hussey | 707/10 |
| 5,870,739 A | * | 2/1999 | Davis, III et al. | 707/4 |
| 5,913,210 A | * | 6/1999 | Call | 707/4 |
| 5,943,670 A | * | 8/1999 | Prager | 707/5 |
| 6,029,164 A | * | 2/2000 | Birrell et al. | 707/3 |
| 6,115,709 A | * | 9/2000 | Gilmour et al. | 707/9 |
| 6,178,419 B1 | * | 1/2001 | Legh-Smith et al. | 707/6 |
| 6,314,421 B1 | * | 11/2001 | Sharnoff et al. | 707/5 |

* cited by examiner

Primary Examiner—Wayne Amsbury
Assistant Examiner—Cindy Nguyen
(74) Attorney, Agent, or Firm—Workman Nydegger

(57) ABSTRACT

Systems and methods for scoping a search. When a content index for electronic data is built, one or more scope restrictions are included in the content index. The scope restriction may be, for example, a root folder identifier, a mailbox identifier, or a URL. Because the scope restriction is included in the content index random access of the property store to determine the scope is avoided. Rather, the scope restriction is implicitly added to a search that uses the content index. By including a scope restriction in the search query, the search results identified from the content index are limited to results that match the scope restriction. Advantageously, the effect of including the scope restriction in the search is ignored if the search results are relatively small or when including the scope restriction provides little benefit.

23 Claims, 3 Drawing Sheets

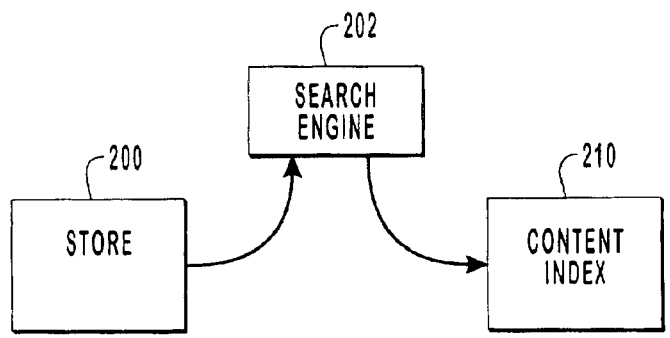
FIG. 2
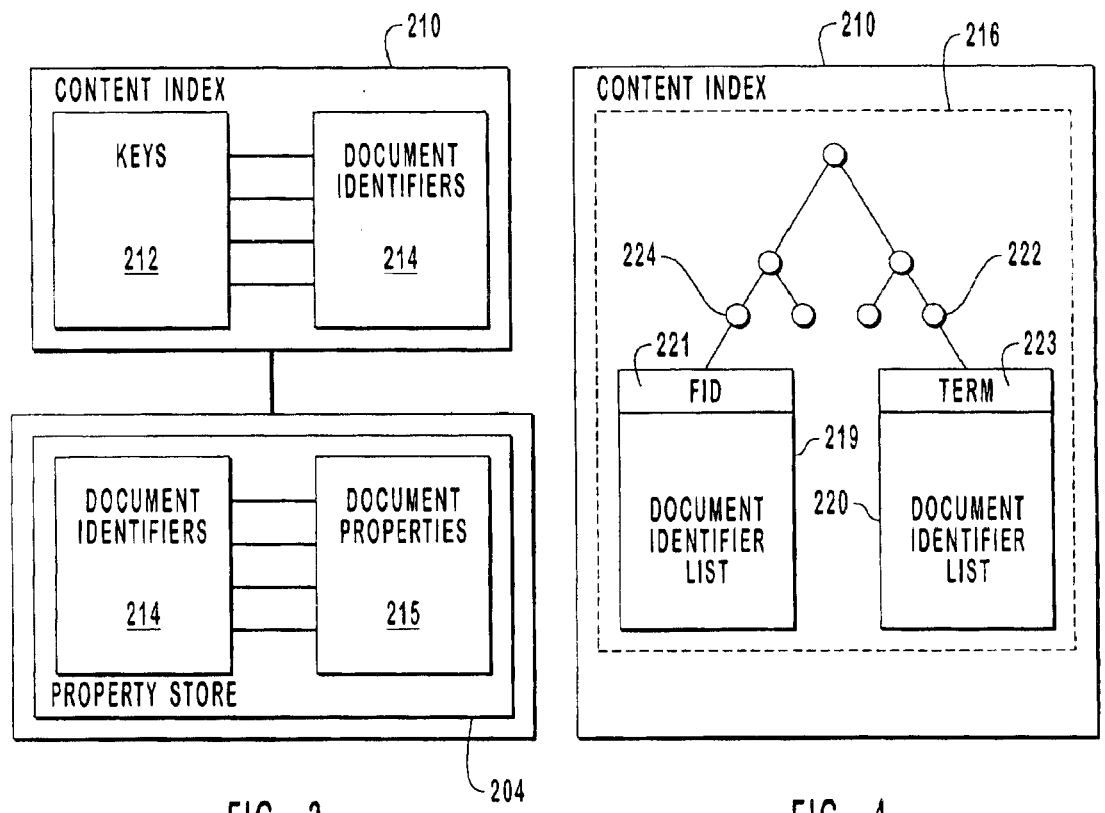
FIG. 3
FIG. 4

SCOPING QUERIES IN A SEARCH ENGINE

BACKGROUND OF THE INVENTION

1. The Field of the Invention

The present invention relates to systems and methods for searching a data store. More particularly, the present invention relates to systems and methods for focusing or scoping a search of the data store by restricting the search results of a query to a particular subset of the search results.

2. The Prior State of the Art

One of the advantages provided by computers is the ability to electronically store information. This information often takes the form of spreadsheets, documents, electronic messages, and databases. Storing information electronically is advantageous for many different reasons. Changes to the stored information can be made quickly and easily by multiple users and the stored information can frequently be electronically sent to another person.

Businesses, home computers, Internet sites and other computer systems all maintain stores of data. These data stores can be specific to a particular type of data or can be a general repository for data. An example of a data store that is specific to a type of data is a mail store, which is primarily used to store electronic messages. In fact, a mail store is a component of practically every computer system. The mail store is highly compartmentalized, and can store a large amount of data. Usually, each user of the computer system is assigned a mailbox in the mail store and the user can store electronic messages in their portion of the mail store and it is not uncommon for each user to store large numbers of electronic messages.

Another significant advantage of storing information or data electronically is the ability to electronically search the information. The ability of a user to search data stores is facilitated by programs that index those data stores. When a user submits a search query, the index assists a user in identifying and locating data or documents that may interest the user. More specifically, the content index for a data store can quickly identify those documents that match a particular search query. The data structures of the content index are highly compact and are inexpensively accessed.

For example, a mail store can contain a significant amount of data in the form of electronic messages and for that reason, the mail store is often indexed to facilitate a search of the mail store for specific electronic messages. Currently, an index of the mail store will allow various messages within the mail store to be identified or located when a user specifies one or more search terms. However, many of the messages identified and located by the search are not contained in the mailbox of the user performing the search. Messages that are not located in the user's mailbox are not useful to the user primarily because the user does not have permission to access those messages. For that reason, the user performing the search is interested only in the messages that are in the user's mailbox. A significant disadvantage of current search techniques is that extra processing time is required to identify which messages in the search results are located in the user's mailbox. This is particularly true when a server computer is indexing the content on behalf of the user.

For example, when a user is searching the mail store, the content index cannot currently account for the fact that the user is usually only interested in messages that are in that user's mailbox. When the user specifies a certain search query, the content index identifies all messages within the mail store that satisfy the search query. These search results must be reduced to those that are specific to the user's mailbox. This is accomplished by accessing the property store for each of the messages identified from the content index to determine which mailbox or folder contains the messages. In other words, the content index does not index mailbox information, which must be retrieved from another source such as the property store. The mailbox information retrieved from the property store is compared against the user's mailbox information and only those messages that are in the user's mailbox or folder are returned in the search results. This process can consume significant processing time because there may be a large number of messages identified by the content index and because the property store is accessed randomly. The property store is randomly accessed because the messages identified by the content index are in no particular order with regard to the mail store. More specifically, the content index does not index or group the mail store according to individual mailboxes.

In other words, the ability to scope or focus a search is currently implemented by filtering the results obtained from the content index against the Uniform Resource Locator (URL) retrieved from the property store for each result. Only those documents whose URL matches the URL of the scope restriction (the user's mailbox) are ultimately returned to the user. As previously indicated, the process of filtering the results against information in the property store can take a long time, especially because the property store is randomly accessed.

SUMMARY OF THE INVENTION

These and other problems with the prior art are overcome by the present invention, which is directed towards focusing and scoping a search. A "Search Engine" or an "Internet Search Engine" is an application that gathers electronic data from various sources or data stores and builds a content index that can service search queries to locate or identify electronic data that satisfies a particular search query.

The content index includes keys or other scope restrictions and is not limited to terms or words. By including scope restrictions in the content index, the search query of a user can be focused or scoped by the content index, which eliminates the need to filter each result against the property store. The extra processing time required to access the property store is therefore significantly reduced because accessing the content index is much faster than accessing the property store.

When a content index is being constructed or altered, root folder identifiers or other scope restrictions are included in the content index. The inclusion of the root folder identifiers in the content index allows a user to perform a content index query for the root folder identifier and obtain a full list of documents that are within the initial scope of the content index. When a user performs a query within the initial scope, the root folder identifier is implicitly added to the search query criteria. This limits the search results to those documents that have the specified root folder identifier.

For example, a user often searches a mail store for electronic documents by formulating a search query having one or more terms. However, the user is only interested in search results from the user's mailbox. In accordance with the present invention, the root folder identifier of the user's mailbox is implicitly added to the search query. By comparing the documents identified by both the root folder identifier and the text or terms of the search query, the search results may be limited to documents within the user's mailbox without accessing the property store.

In some instances, the scope restriction is ignored in cases when the search query would otherwise return relatively few results. This can occur, for example, when unique terms are used that occur in relatively few documents. The actual number of results that will effectively eliminate the scope restriction from the search query can be adjusted as needed. When the scope restriction is not used, it may be necessary to access the property store as previously described. However, this does not require significant processing time because the number of documents in the search results is small.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 is a block diagram illustrating the creation of a content index;

FIG. 3 illustrates the use of the content index in performing a search of a data store;

FIG. 4 is a diagram of a content index that includes scope restrictions; and

DETAILED DESCRIPTION OF THE INVENTION

Figure 1:
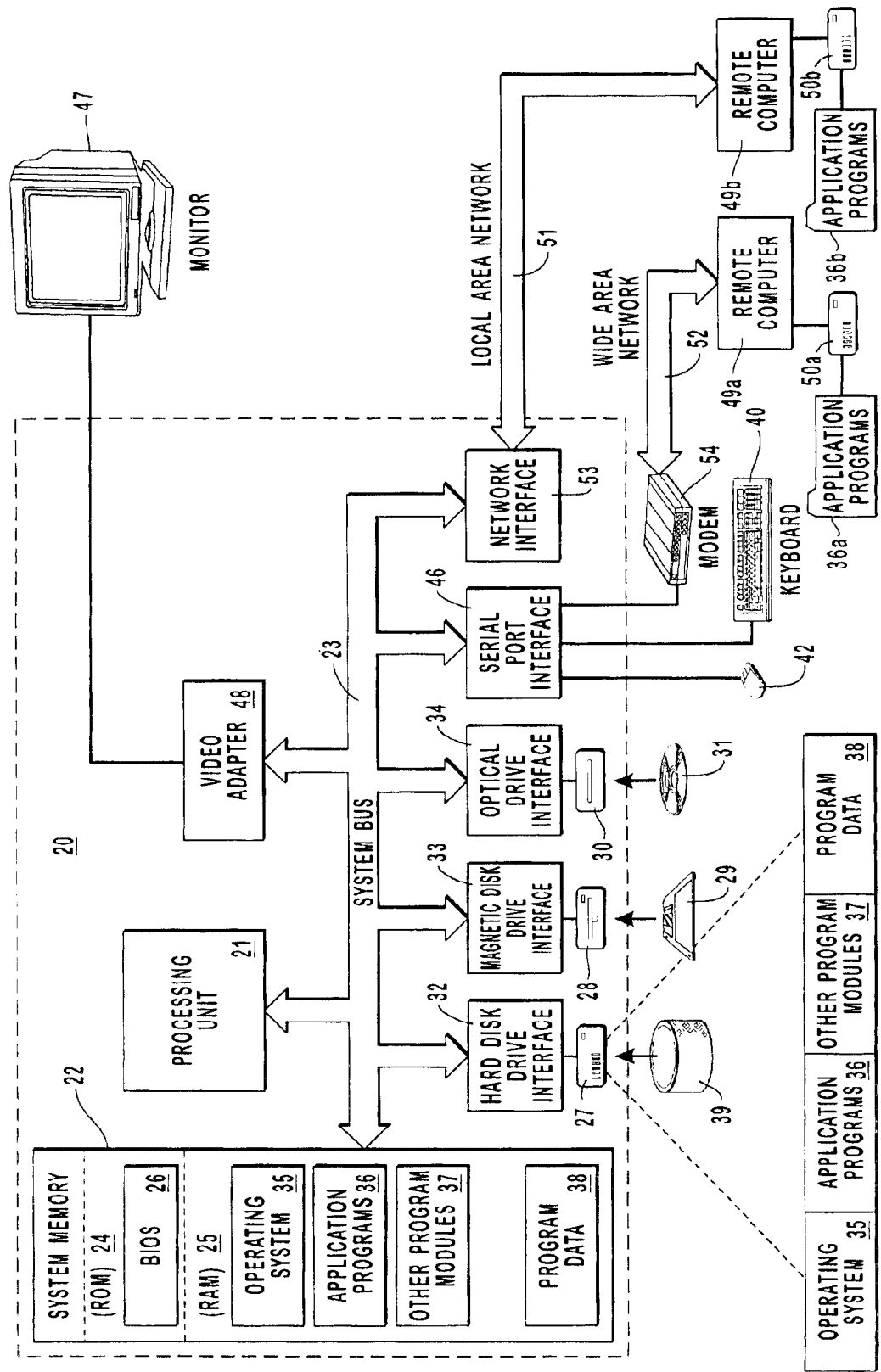
FIG. 1 illustrates an exemplary system that provides a suitable operating environment for the present invention.

Searching a data store is often hindered by the need to scope or focus the search results. The present invention overcomes this and other problems of the prior art. As used herein, "scoping" refers to restricting a search query to a particular subset of results or documents based on a scope restriction such as a folder identifier or a URL. Scoping also refers to producing search results from a content index by including the scope restrictions in the content index. Scoping searches is particularly useful in situations where the initial scope restrictions are well defined. For instance, the user mailboxes of a mail system are the initial scope restriction for user searches of the mail system and in a web crawl, the initial scope restriction can be the URLs on a given site, or a set of URLs produced by following a particular starting URL.

Scoping search results is often necessary in order to return valid search results to a particular user. For example, when a user searches a mail store, the user is usually only interested in the results from the user's mailbox. The actual search, however, identifies all of the messages in the data store that satisfy the search. As a result, the search must be scoped to those messages within the search results that are in the user's mailbox. Previously, this was accomplished by accessing a property store for each document in the search results to identify those messages that are in the user's mailbox.

By including the scope restrictions in the content index, a search can quickly identify the relevant subset of messages without having to access the property store. Typically, the scope restrictions are within the initial scope of the content index. For example, if the initial scope of a content index is a mail store, then an exemplary scope restriction would be a particular mailbox within the mail store.

The present invention extends to both methods and systems for scoping searches. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

FIG. 2 is a block diagram generally illustrating an environment or system in which the present invention may be implemented. FIG. 2 also illustrates the construction or alteration of a content index. The store 200 is an exemplary medium for storing data and may be a computer readable medium as described above. The store 200 can be used to specifically store a particular type of data, such as word processing documents, electronic messages such as e-mails, or the like, or can be used to store many different types of data. The store 200 can also be partitioned. For example, when the store 200 is a mail store used to store electronic messages, the store 200 is often partitioned into mailboxes. The store 200 can also refer to multiple data stores. For example, the store 200 can be the Internet.

The search engine 202 is a computer program or process that gathers electronic documents and other data from the store 200 to create a content index 210. The search engine 202 gathers data from any number of different stores or different server computers and the like. As a result, the content index 210 is an index or reflection of the electronic data kept on the stores searched or crawled by the search engine 202. One advantage of the content index 210 is that a search for data on the store 200 is aided by the content index 210. The scope of the content index 210 is therefore described by the store 200. The scope of the content index 210 is not limited, however, to a single data store. Similarly, a single data store can be indexed by more than one content index 210. For discussion purposes, the store 200 is generally referred to as a mail store that is partitioned into multiple mailboxes. However, the store 200 can be used for other types of data.

In addition to indexing the terms or words of the documents and data being gathered from the store 200, scope restrictions such as folder identifiers are also placed in the content index 210 as the content index is being created or built. If a particular data store does not provide a folder identifier, then a URL that matches the initial scope is applied during the gathering process. The folder identifier is unique across all other folder identifiers and is indexed along with the other documents included in the initial scope. The scope restrictions are sometimes considered to be non text even though the scope restrictions may be represented in the content index alphanumerically. URLs, for example, can be treated as either text or non-text. In the case of a mail store, the content index 210 will likely include a different folder identifier for each mailbox.

FIG. 3 is an illustration of the context index 210 and a property store 204. As illustrated, the content index 210 includes keys 212 which are closely associated with document identifiers 214. The full text content index now includes non-textual data that allows the search query to be executed more rapidly. Because searches are often performed on words or terms, the keys 212 are typically implemented as words, terms or text. For example, the word "patent" may be a key in the content index 212 and this specific key is associated with the document identifiers 214 of those documents that contain the specified key or word. In this manner, the content index 210 identifies all of the documents or other data that contain the identified key or word. The keys 212 can also be illustrated as groups of words, phrases, Boolean expressions, and the like.

In a typical search where the content index 210 does not include scope restrictions or other identifiers, the keys 212 are used to identify the document identifiers 214. Even though the documents are identified, their location within the store 200 is unknown. The locations or Uniform Resource Locators (URLs) of the documents in the store 200 are stored in the document properties 215. In other words, the property store 204 links the document identifiers 214 to the document properties 215. In order to actually locate the documents identified by the document identifiers 214, the property store 204 must be accessed and queried for the location of each document or search result. Another identifier that is used to locate a document in the store 214 is the combination of a folder identifier (FID) and a message identifier (MID). The binary structure of the FID and the MID allows a particular message in a mail store to be found very quickly.

As previously indicated, this can be a lengthy task in certain circumstances. For example, if a user is searching for documents within a particular folder on the store 200, then the document properties 215 must be accessed for both the location of the document as well as which folder each document is in. Because the content index 214 only maintains the document identifies 214, the property store 204 is randomly accessed to determine these values for each document identifier provided from the content index 210. In other words, the organization of the document identifiers 214 does not usually correspond to the organization of the document properties 215. For this reason, the property store is accessed randomly for the document identifiers 214 identified from the content index 210. If the number of document identifiers 214 is large, then the process of identifying those documents that are specific to a particular folder can consume significant processing time. Because the property store is accessed randomly, the search engine may actually have to access a disk for each search result instead of memory. Accessing a disk is very slow when compared to accessing memory.

FIG. 4 illustrates another example of the content index 210 that can significantly reduce the processing time required to identify specific documents because the content index shown in FIG. 4 includes scope restrictions. Often, the content index 210 is constructed as a balanced tree 216 that is able to minimize access times. The content index 210 can also be structured using other data structures that optimize access times. In some instances, the content index 210 is compressed as well.

In the case of the tree 216, the nodes are often representative of specific keys as previously described. A list of document identifiers is usually associated with each node or key. In FIG. 4, the node 222 is the portion of the tree 216 that represents the term 223. The document identifier list 220 is associated with the term 223 and the node 222. Thus, when a person searches for a particular key, word, or term, the content index 210 can identify the documents that contain the key, word, or term by the document identifiers found in the document identifier list 220.

As previously discussed, prior art indexes are unable to scope the document identifiers returned by those indexes. The content index 210 illustrated in FIG. 4 overcomes this limitation by including scope restrictions such as folder identifiers "FIDs" in the content index 210. Usually, the root FID that identifies an entire mailbox is used because users typically search within their own mailboxes. In this example, the document identifier list 219 includes document identifiers that are contained in a particular folder. The folder identifier is included as a key and the folder identifier is indexed within the content index 210. Thus, the node 224 is the portion of the tree 216 that represents an FID and the document identifier list 219 is associated with the FID 221 and the node 224. The tree 216 can contain other nodes that are associated with other FIDs or with other scope identifiers. In this manner, a particular FID, such as the FID 221 can be used to identify a particular subset or search results that are in a particular folder or location. More specifically, the document identifier list 219 can be used to reduce or trim the document identifier list 220 such that the remaining document identifiers in the document identifier list 220 are contained in the folder associated with the FID 221.

Thus, including the FIDs in the content index 210 allows a user query to be scoped to a particular subset of documents based on the URL or other scope restriction. Because the search is focused or scoped by the FID, URL or other scope restriction, the costly processing action of accessing the property store is effectively eliminated. Including the FID in this manner is particularly useful in data stores that are highly partitioned. Another advantage of including the scope restrictions in the content index 210 is that the user does not have to explicitly include the scope restriction in the search query. Rather, the scope restriction is implicitly added to the search query.

For example, in a mailbox store, a user may desire to search for all documents containing a particular key or term. If the FID is not included in the content index, then the property store will have to be accessed for each document identifier in the document identifier list. Because the document identifiers in the document identifier list are not in any particular order, the property store is randomly accessed. As previously mentioned, this can be a computationally expensive action.

In FIG. 4, the FID 221 of the actual mailbox, http://mymailstore/mymailbox, is indexed in the content index 210. Instead of accessing the property store for each document identifier, the document identifiers in the document identifier list 220 are compared against the document identifiers in the document identifier list 219. The result of this comparison, which identifies a subset of documents in mymailbox that satisfy the search query, is returned in the search results. In other words, the document identifiers that appear in both document identifier lists are returned to the user. Thus, the user's search query is scoped or focused to the user's own mailbox in this example.

The comparison of the document identifier list 219 with the document identifier list 220 is not always performed in order to optimize the search query. For example, if the document identifier list 220, which represent the documents that contain the term 223, is small, then no comparison is made with the document identifier list 219. Instead, the property store will be accessed for those documents because it is computationally less expensive.

Figure 5:
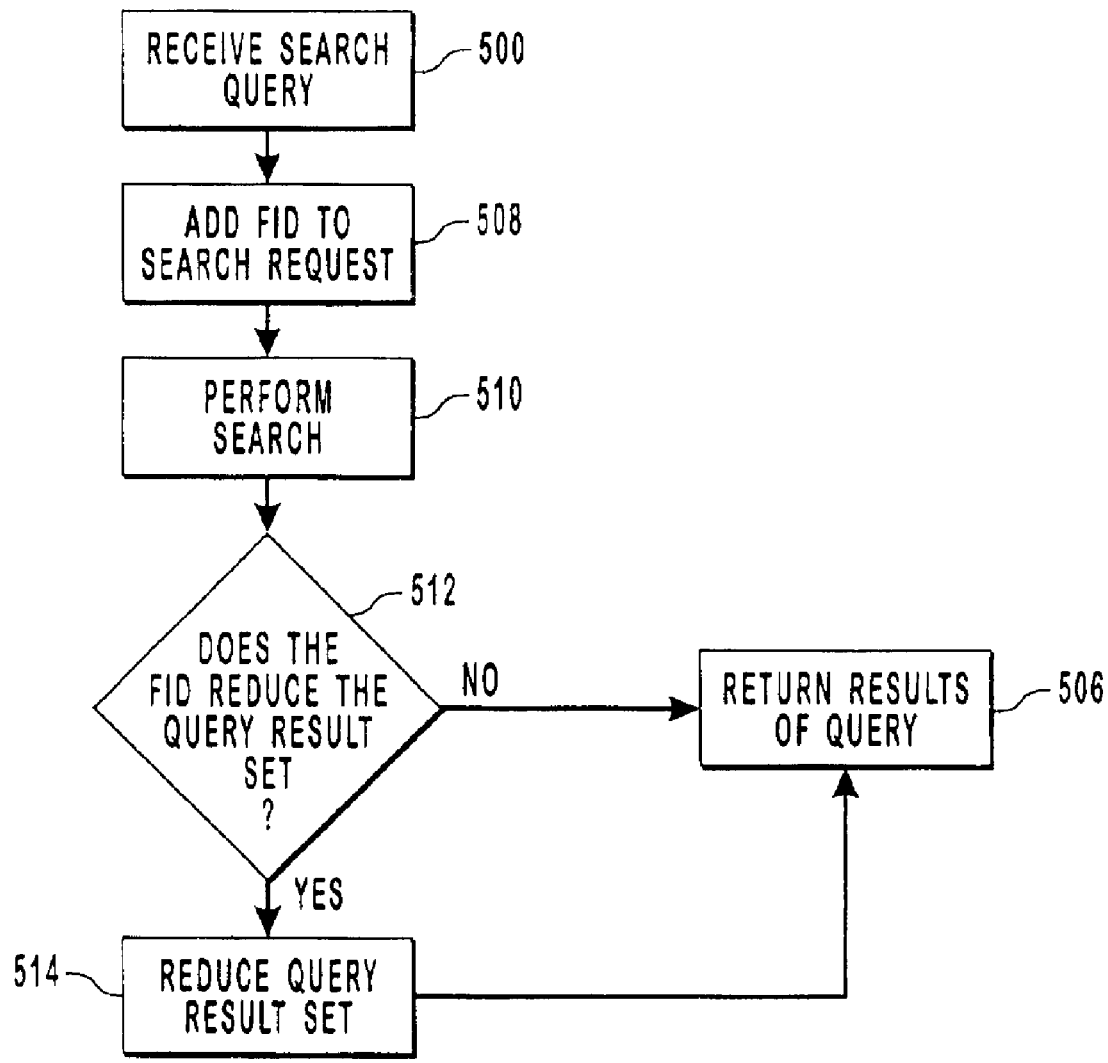
FIG. 5 is a flow diagram illustrating how the content index, which includes scope identifiers, may be used to execute a search of a data store.

FIG. 5 is a flow diagram that illustrates how including scope restrictions such as the FID in the content index can focus or scope a search. In step 500, the search query is received. The search query usually contains one or more terms or combination of terms. In step 508, an FID or other identifier is added to the search query. Usually, the root FID that identifies an entire mailbox is used because users typically search within their own mailboxes. The search query thus contains keys or words specified by the user plus the FID, root folder identifier, or other identifier. In step 510, the search is performed using both the keys and the root folder identifier to determine or identify the document identifiers stored in the content index that satisfy the search.

In step 512, the document identifiers for the root folder identifier are examined against the document identifiers for the keys or words and a determination is made as to whether the document identifiers associated with the root folder identifier can reduce the overall number of document identifiers to be returned to the user. This often depends on the number of document identifiers associated with both the keys and the root folder identifier as well as the relative sizes of the sets of document identifiers.

If the list of document identifiers for the keys is small in comparison to the list of document identifiers associated with the root folder identifier, then no comparison is made between the lists and the results of the search query are returned to the user in step 506. For example, if the relative sizes of the sets of document identifiers is 8 to 1 or less, then no comparison is made between the lists and the results of the search query are returned in step 506. If the list of document identifiers for the keys is large in comparison to the list of document identifiers associated with the root folder identifier, then the lists are compared and the resulting set of document identifiers is reduced in step 514 and the reduced set of results for the search query are returned to the user in step 506. Exemplary comparisons between the document identifier lists 219 and 220 include determining which document identifiers exist in both lists, subtracting the list 219 from the list 220, and the like.

The implicit use of the root folder identifier included in the content index is judiciously used such that the processing time required to identify the relevant document identifiers is improved. Using FIG. 4 as an example, a comparison between the document identifier lists may not be performed when processing the search query if the document identifier list 219 is larger than the document identifier list 220. More generally no comparison is performed between the document identifier lists 219 and 220 when it is computationally efficient to only process the document identifier list 220 as previously described. It is more efficient, in some cases, to perform a slow operation such as randomly accessing the property store a small number of times rather than perform a fast operation a large number of times. When this condition is met, the effect of including the scope restriction or other identifier in the search is removed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a data store and a property store, wherein the data store is indexed by a content index that is built using terms gathered from objects contained in the data store, and wherein the property store contains items that identify various properties of the data objects including folder locations of the data objects in the data store, a method for scoping a search of the data store in order to identify and return a desired subset of objects contained within one or more folders in the data store, and doing so without accessing the property store, wherein the search includes one or more terms, the method comprising:

an act of indexing one or more unique folder identifiers in the content index that correspond to one or more folders located in the data store whenever the content index is built and altered, so that the one or more folder identifiers is implicitly included in a search of the content index;

an act of receiving a search request from a user for documents that include the one or more search terms, the search request also including at least one of the folder identifiers;

an act or identifying a first list of the content index that contains document identifiers, to facilitate scoping, by using the one or more search terms;

an act of identifying a second list of the content index that contains document identifiers by using the one or more folder identifiers from the content index; and an act of comparing the second list of document identifiers against the first list of document identifiers to identify a subset of document identifiers that appear in both the first and second lists, such that the subset of document identifiers can be returned without having to access to the property store to determine the location of the documents in the data store.

2. A method as defined in claim 1, wherein the act of including one or more identifiers in the content index further comprises an act of building the content index.

3. A method as defined in claim 1, further comprising an act of returning the subset of document identifiers without accessing the property store.

4. A method as defined in claim 1, wherein the act of comparing the second list of document identifiers with the first list of document identifiers further comprises an act of restricting the search based on the one or more identifiers.

5. A method as defined in claim 1, wherein the one or more folder identifiers are added to the search request automatically, in an implicit manner.

6. A method as defined in claim 5, wherein the one or more folder identifiers is unique across the content index.

7. A method as defined in claim 1, wherein the one or more folder identifiers is a Uniform Resource Locator.

8. A method as defined in claim 1, wherein the act of comparing the second list of document identifiers with the first list of document identifiers further comprises an act of intersecting the second list of document identifiers with the first list of document identifiers to identify the subset of document identifiers.

9. A method as defined in claim 1, further comprising an act of refraining from comparing the second list of document identifiers with the first list of document identifiers when the second list of document identifiers cannot reduce the first list of document identifiers.

10. A method as defined in claim 1, further comprising an act of refraining from comparing the second list of document identifiers with the first list of document identifiers when processing only the first list of document identifiers is more efficient.

11. In a system including one or more data stores, a property store that contains items that identify various properties of the data objects, and a search engine that gathers and indexes data from the one or more data stores into a content index, a method for focusing a search of the one or more data stores in order to identify and return a desired subset of objects contained in the one or more data stores, and doing so without accessing the property store to identify the location of the one or more data objects, wherein the search includes one or more terms, the method comprising:

an act of including one or more scope restrictions in the content index that identify one or more folders where data objects are located that are indexed by a content whenever the content index is built and altered, wherein the one or more scope restrictions are non-text;

an act of receiving a search request from a user for documents that include the one or more search terms;

an act of implicitly adding at least one of the one or more scope restrictions to the search, such that the one or more scope restrictions are automatically included in a search of the data store;

an act of identifying a first list of document identifiers from the content index by using the one or more search terms of the search;

an act of identifying a second list of document identifiers from the content index by using the at least one scope restriction;

a step for generating a subset list of document identifiers that are contained in both the first end second lists of document identifiers; and returning the subset list of document identifiers to a user without accessing the property store to identify the folder locations of the data objects that comprise the searched for documents.

12. A method as defined in claim 11, wherein the act of including one or more scope restrictions in the content index further comprises an act of building the content index.

13. A method as defined in claim 11, wherein the folder identifier is unique across the content index.

14. A method as defined in claim 11, wherein the scope restriction is a Uniform Resource Locator.

15. A method as defined in claim 11, wherein the step for generating a subset list of document identifiers further comprises a step for comparing the first list of document identifiers with the second list of document identifiers.

16. A method as defined in claim 11, wherein the step for generating a subset list of document identifiers further comprises a step of intersecting the second list of document identifiers with the first list of document identifiers.

17. A method as defined in claim 11, wherein the step for generating a subset list of document identifiers further comprises a step for identifying matching document identifiers from the first list of document identifiers and the second list of document identifiers, wherein the matching document identifiers are included in the subset list of document identifiers.

18. A method as defined in claim 11, further comprising a step for refraining from generating a subset list of document identifiers when it is efficient to only process the first list of document identifiers.

19. A method as recited in claim 1, wherein the one or more identifiers are non-text.

20. A method as recited in claim 1, wherein the data store includes a mail store partitioned into a plurality of mailboxes.

21. A method as recited in claim 20, wherein the one or more identifiers identifies a particular one of the mailboxes.

22. A method as recited in claim 21, wherein the first and second lists of document identifiers correspond to one or more passages in the particular one of the mailboxes.

23. A computer program product for use in a system that includes one or more data stores, a property store that contains items that identify various properties of the data objects, including folder locations of the data objects in the one or more data stores, and a search engine that gathers and indexes data from the one or more data stores into a content index, the computer program product comprising one or more computer-readable media having computer-executable instructions for implementing a method for focusing a search of the one or more data stores in order to identify and return a desired subset of objects contained within one or more folders in the one or more data stores, and doing so without accessing the property store, wherein the search includes one or more terms, wherein the method comprises:

an act of indexing one or more scope restrictions to the content index that identify one or more folders where data objects are located that are indexed by a content index, wherein the one or more scope restrictions are non-text;

an act of receiving a search request from a user for documents that include the one or more search terms;

an act of implicitly adding at least one of the one or more scope restrictions to the search, such that the one or more scope restrictions are automatically included in a search of the data store;

an act of identifying a first list of document identifiers from the content index by using the one or more search terms;

an act of identifying a second list of document identifiers from the content index by using the at least one scope restriction;

an act of focusing the first list of document identifiers by using the second list of document identifiers to generate a subset list of document identifiers that are contained in both the first and second lists of document identifiers; and returning the subset list of document identifiers to the user without accessing the property store to identify the folder locations of the data objects that comprise the searched for documents.

* * * * *